United States Patent [19]

Sachs

[11] Patent Number: 4,517,471
[45] Date of Patent: May 14, 1985

[54] ROTARY CONVERTER MACHINE FOR DIRECT TRANSFER OF ELECTRIC ENERGY BY FLUX LINKAGE BETWEEN WINDINGS ON A STATOR PACK

[75] Inventor: Klaus Sachs, Osterode/Harz, Fed. Rep. of Germany

[73] Assignee: Anton Piller GmbH & Co. KG, Harz, Fed. Rep. of Germany

[21] Appl. No.: 401,317

[22] Filed: Jul. 23, 1982

[30] Foreign Application Priority Data

Jul. 29, 1981 [DE] Fed. Rep. of Germany ....... 3129928

[51] Int. Cl.³ .............................................. H02J 9/08
[52] U.S. Cl. ..................................... 307/67; 310/113; 310/160; 322/58; 323/201; 323/348; 336/120; 336/135
[58] Field of Search ............... 323/201, 204, 264, 348; 363/175, 176; 322/16, 58, 39; 310/165, 160, 113, 169, 170; 307/47, 46, 67, 68; 336/120, 135

[56] References Cited

U.S. PATENT DOCUMENTS

| | | | |
|---|---|---|---|
| 2,428,203 | 9/1947 | Creedy | 310/160 |
| 2,442,751 | 6/1948 | Abbott | 336/135 |
| 2,787,824 | 4/1957 | Kaczor | 310/113 |
| 3,085,192 | 4/1963 | Maier | 336/135 |
| 3,555,396 | 1/1971 | Kalman | 323/204 |
| 3,571,690 | 3/1971 | Apsit | 307/67 |
| 4,155,114 | 5/1979 | Tsuchiya et al. | 310/160 |
| 4,368,418 | 1/1983 | De Mello | 323/201 |

FOREIGN PATENT DOCUMENTS

| | | | |
|---|---|---|---|
| 2178790 | 4/1972 | France | |
| 1584396 | 2/1981 | United Kingdom | 307/67 |

Primary Examiner—William H. Beha, Jr.
Attorney, Agent, or Firm—Gottlieb, Rackman & Reisman

[57] ABSTRACT

A rotary converter machine which includes a stator with three-phase primary, and secondary windings, and a rotor mounted within the stator which includes a damping winding. The primary and secondary stator windings are arranged on a common stator pack and located in continuous stator slots, both windings extending over the whole axial length of the common stator pack. The converter machine provides a direct transfer of the electrical energy by flux linkage between the two windings. The rotor is driven by the rotating magnetic field either asynchronously, if a drum rotor is provided, or synchronously, if a salient-pole rotor is provided.

17 Claims, 8 Drawing Figures

ROTARY CONVERTER MACHINE FOR DIRECT TRANSFER OF ELECTRIC ENERGY BY FLUX LINKAGE BETWEEN WINDINGS ON A STATOR PACK

BACKGROUND OF THE INVENTION

The invention relates to a rotary converter machine comprising a stator with a three-phase primary winding and a three-phase secondary winding as well as a rotor being rotatably mounted in the stator.

Rotary converter machines as known are usually provided with a three-phase synchronous motor and a three-phase synchronous generator having the same number of poles, which are provided within a common housing. In the stator are provided two separate stator packs for the stator windings of the motor and the generator axially at a distance. The rotors for the motor and the generator are arranged with corresponding axial distance on a common shaft. Such rotary converter machines therefore consist of two machines coupled mechanically together via the common shaft (U.S. Pat. No. 2,787,824). Such rotary converter machine thus basically corresponds to known arrangements in which a motor and a generator with separate housings are mounted on a common base plate, whereby the shafts are connected by coupling elements.

With all known rotary converter machines the electric power fed into the motor is first converted into mechanical shaft power, by which the generator is then driven, which converts said mechanical power again into electrical power.

An object of the invention is to provide a rotary converter machine with a considerably reduced weight per horse-power, a considerable improvement in efficiency, as well as an increase in short-circuit current compared with converter machines known in the art.

SUMMARY OF THE INVENTION

According to the invention, a rotary converter machine comprises a stator with a three-phase primary winding and a three-phase secondary winding as well as a rotor being provided with a damping winding and rotatably mounted in the stator, said primary winding and said secondary winding being arranged on a common stator pack and are located in continuous slots in the stator, each of the two windings extending over the whole axial length of said common stator pack.

Advantageous embodiments of the converter machine in accordance with the invention will appear hereinafter.

Object of the invention are further converter systems including a rotary converter machine in accordance with the invention which are described hereinafter.

A specific object of the invention is further a converter system with a rotary converter machine to be used as an emergency power system which system is also described hereinafter.

BRIEF DESCRIPTION OF THE DRAWINGS

In the accompanying drawings are illustrated by way of example a converter machine and several embodiments of converter systems which are described in detail hereinafter.

DESCRIPTION OF PREFERRED EMBODIMENTS

Figure 1:
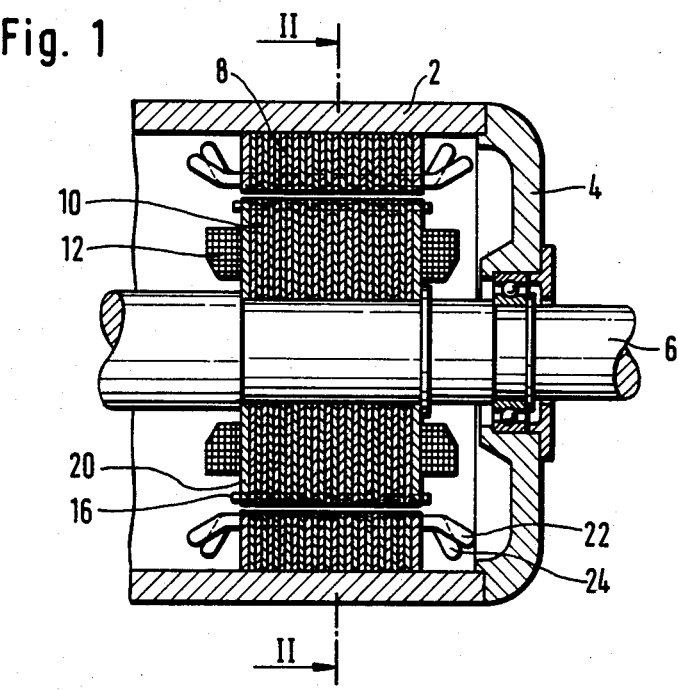
FIG. 1 shows schematically a longitudinal section through an embodiment of a converter machine in accordance with the invention.

The converter machine which is shown in FIG. 1 in section has a housing 2 with bearing brackets 4, only one of which is shown in FIG. 1, and in which a rotating shaft 6 is mounted. Within the housing 2 there is a stator pack 8, which is contructed as a common stator pack for a primary winding 22 and a secondary winding 24, which are preferably of identical formation.

A winding diagram of a converter machine referred to will be described in detail below with reference to FIG. 8.

On the shaft 6 there is fitted a field rotor 10 which in this case is formed as a salient-pole rotor with four poles, but may also be designed as a drum rotor. The rotor 10 is assigned to both the stator windings in common. The rotor 10 is provided with a damping winding. Damping rods 16, constituting a damping winding, are disposed in the pole pieces 14 and are short-circuited at their front ends. This short-circuiting is preferably achieved through copper plates 20 covering the end plates of the rotor plate pack and corresponding to the shape of the rotor plates.

In case of the embodiment shown the salient-poles of the rotor 10 are provided with windings 12, via which it may be excited by direct current. The current is preferably transferred to the winding in brushless manner as known in the art.

Figure 2:
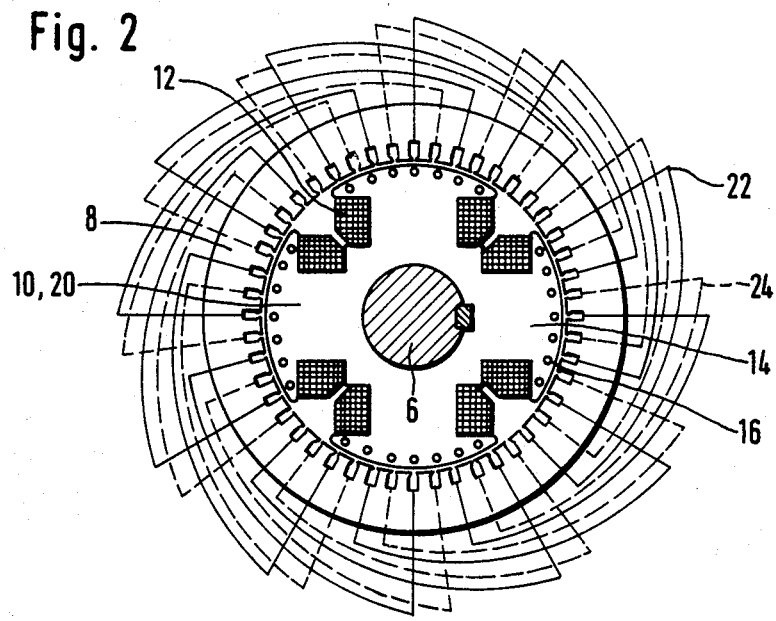
FIG. 2 shows a section along the line II in FIG. 1, with windings drawn schematically.

The primary winding 22 and the secondary winding 24 are indicated in FIG. 1 diagrammatically by different cranking of the winding heads. In FIG. 2 the conductors of the primary winding 22 are represented by continuous lines, and those of the secondary winding 24 by dotted lines. The windings 22 and 24 are shown in the drawing on a machine of a four-pole, three-phase design, with a shortened winding pitch—5/6 of the pole spacing. Only a single-layer winding is shown in the drawing. In practice the windings will be constructed as complete two-layer windings, laid out in accordance with the rules known in the design of electrical machines. By suitable chording of the windings and screwing of the slots, any desired approximation of the voltage curve to a sine form can be achieved. For this purpose, it may sometimes be an advantage to accommodate some conductors of one winding system also in neighbouring slots of the other winding system.

With the converter machine provided by the invention, the power supplied by the primary winding is not transformed into mechanical energy. Instead there is a direct transfer of the electrical energy by flux linkage between the two windings 22 and 24.

The rotor 10 is driven by the rotating magnetic field of the primary winding 22. If the rotor is formed as drum rotor, it is driven asynchronously. If the rotor is formed as salient-pole rotor, it is driven synchronously.

By the damping winding in the rotor all harmonics of the primary voltage are effectively short-circuited and thereby eliminated in the flux. In this way only the fundamental frequency is transferred from winding 22 to winding 24.

By controlling the direct current exciting the rotor 10, the magnitude of the magnetic flux, and thereby the voltage in the secondary windings is controllable independent of the voltage in the primary winding.

The start-up of the converter machine is effected by a starter motor as known in the art, as long as the machine is not designed for an asynchronous start-up.

The frame size of the converter machine is designed for the combined powers of the primary and secondary windings, i.e. the frame size is twice the frame size for which the motor and generator has each to be designed in known single housing machines of the same power. Thereby a substantial reduction of weight per horsepower is achieved in addition to a higher efficiency obtained. Moreover an approximately double short-circuit current is reached. Further, the overall length is reduced substantially with only a slight increase of the diameter of the machine.

With a salient-pole rotor the converter generates in its secondary windings a constant sinusoidal voltage independent of load variations, and unaffected by all events in the network to which the primary winding is connected. A potential controller is provided for voltage regulation as will become apparent below and this controls the magnetic flux of the machine via the d.c. excitation of the rotor, preferably in such a way that the voltage of the secondary winding stays substantially constant. As already mentioned, a sinusoidal voltage is achieved by suitable winding design, i.e. by chorded winding and if necessary by screwing of the slots. Harmonics in the supply network produce rotary fields of higher frequency, which as mentioned can be effectively eliminated by suitable design of the damping winding.

With a drum rotor the converter generates a sinusoidal voltage in the secondary winding free of harmonics which may be present in the primary winding. The voltage in the secondary winding is in this case proportional to the voltage in the primary winding.

In both cases the 5th, 7th, 11th, 13th, 17th and 19th harmonics can, for example, be almost completely short-circuited in the damping winding, if the damping rods are arranged with a spacing of 10 electrical degrees. Harmonics of these orders appear particularly when the converter machine is operated with inverters, as will be described later. With a damping winding thus dimensioned, a considerably reduced distortion of the voltage also occurs when the secondary winding comes under load by rectifiers. Owing to the double-rated frame size of the converter machine, the voltage distortion amounts to only a half of that occurring in a converter machine of known construction designed under same preconditions.

As mentioned above the power is transferred from the primary winding to the secondary winding by flux linkage. There is to be applied no torque to the rotor shaft except in case of using the converter machine in connection with a prime mover in an emergency power unit, or of using the wheel weights, as to be described below.

In the following various converter systems are described operating with a converter machine in accordance with the invention.

In each of the circuits shown in FIGS. 3 to 7 the rotor 27 of the converter machine 25 is shown schematically. The excitation is preferably achieved in known brushless manner, as mentioned above. The excitation is regulated via a voltage governor 29 in dependence on the voltage of the secondary winding 24.

Figure 3:
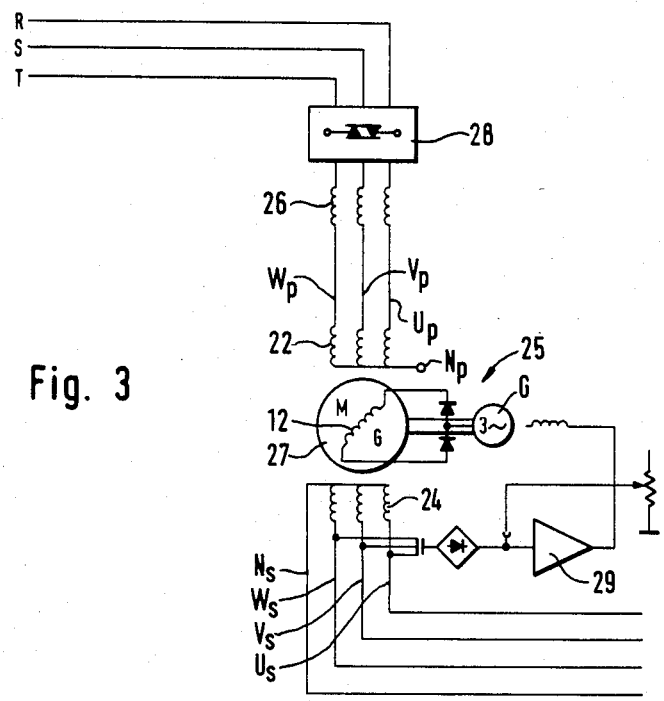
FIGS. 3 to 6 show various converter systems including converter machines in accordance with the invention.

FIG. 3 shows a circuit including a converter machine 25, the primary winding 22 of which is connected to three-phase AC mains via chokes 26 inserted in the individual connecting lines. The purpose of the chokes 26 is to avoid interfering wattless currents appearing especially if the voltage in the mains is varying during voltage regulation at the secondary winding 24. The chokes restrict the wattless current to values which do not interfere. For example, by suitable dimensioning of these chokes, with a voltage fluctuation in the primary network of ±10%, the power factor in said primary network will vary only between 0.9 leading and 0.9 lagging. As, during undervoltage in the mains wattless power is supplied into said primary network, the primary network is effectively supported by the converter machine.

The converter machine thus operated has stabilizing properties, i.e., as explained above the output voltage is independent of all voltage fluctuations and harmonics in the mains. Because of the rotating masses in the machine, which if necessary can be augmented e.g. by additional flywheel weights, short interruptions up to 1 sec of the primary current supply which can occur during switching operations in the network, or on automatic reclosing under short-circuit conditions, can be bridged over by the mechanical energy stored in said rotating masses. To avoid energy feedback into a disturbed primary network, it is advantageous to insert a quick-break switch 28 between the converter machine 25 and the primary network. This switch is preferably a static switch consisting of Triacs or counter-parallel connected thyristors or similar semi-conductor elements.

Figure 4:
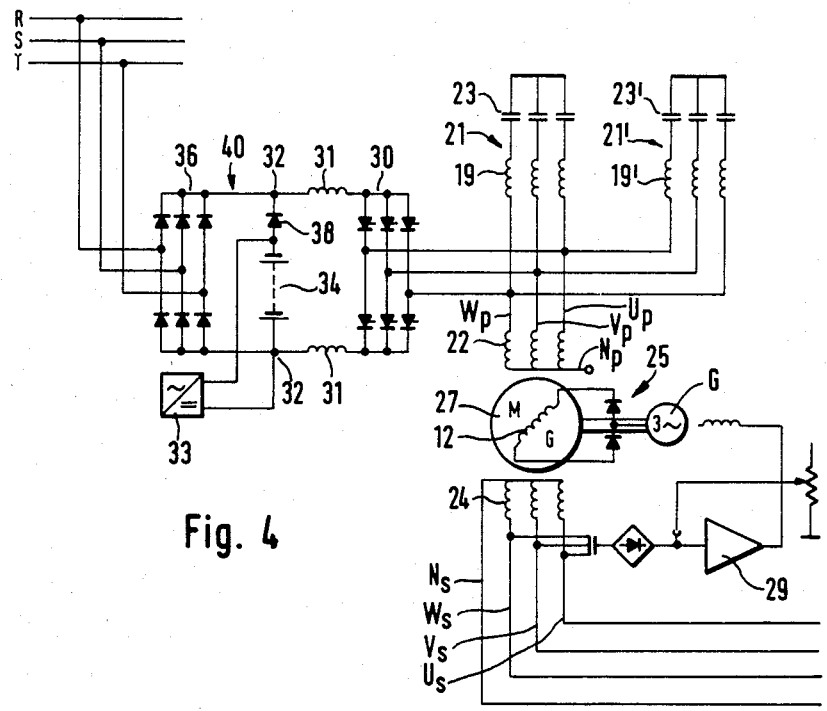

FIG. 4 shows a circuit with converter machine 25 which is operated in known manner as a motor fed by an inverter. In this the energy to be supplied to the primary winding comes from a power supply means 40. This power supply means includes an inverter 30, which can be fed from a direct-current source 32 via smoothing chokes 31. The primary winding 22 of the converter machine 25 can provide the wattless power required to operate the inverter 30. Such a system can be operated as a frequency changer and has the property of an uninterruptable power supply unit, if the direct-current circuit 32 includes a battery 34. Normally the direct-current energy is supplied by regulated or unregulated rectifiers 36 connected to a three-phase AC primary network. When regulated rectifiers are provided, these can be used for charging of a d.c. battery 34 permanently connected to the direct-current source 32. When regulated rectifiers are provided, the battery is connected to said direct current source 32 only during primary network breakdowns, and it is charged via a separate charging device 33. A diode 38 which opens during normal, i.e. mains operation can be used as a switch.

In case of operation with an inverter the primary winding 22 is additionally loaded especially by the 5th and 7th harmonics enforced by the inverter 30. This additional current load may amount to 30–35% of the normal load and results in a respective additional thermal load of the primary winding.

The harmonics enforced by the inverter, especially the 5th and 7th harmonics, can be suppressed by using filter circuits 21, 21' including chokes 19, 19' and capacitors 23, 23' connected in series as harmonics filters. These filters are preferably series-tuned wave traps performing as series-resonant circuits, with resonance frequencies corresponding to the 5th and 7th harmonics frequency respectively. The filters act like capacitors for the basic frequency. Especially favourable conditions are obtained if the capacitors 23, 23' of the resonance circuits are chosen in such way that they cover the wattless power of the inverter. Such a design relieves the primary winding 22 of the converter from both said current load resulting from the current harmonics as well as largely from said wattless power of the inverter resulting together in a favourable influence on the efficiency.

Filter circuits as described above can also be provided with the circuits to be described below under reference to FIGS. 5 and 6.

Figure 5:
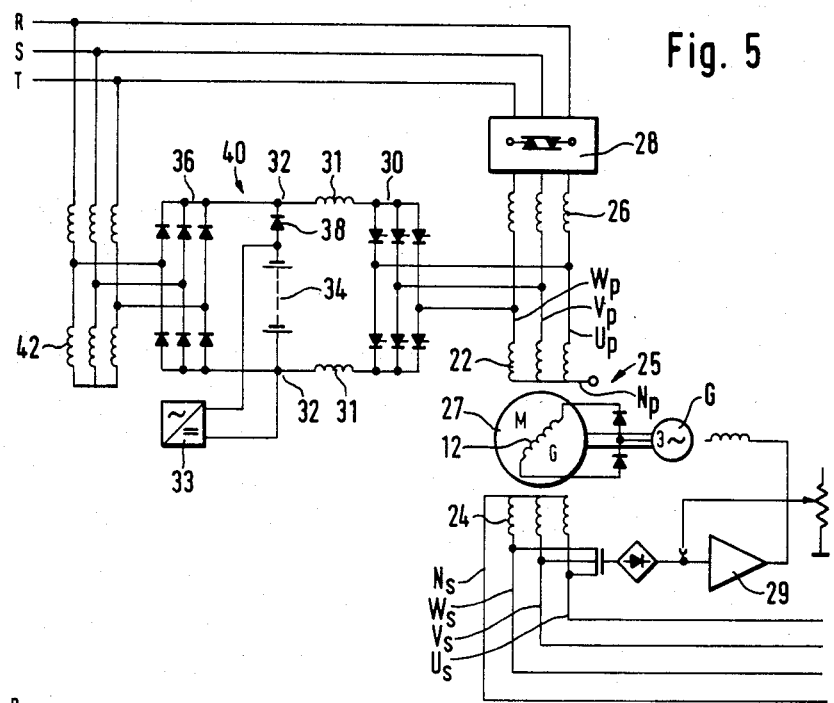

In the circuit shown in FIG. 5, the primary winding 22 of the converter machine 25 is connected as in the embodiment shown in FIG. 3, to the three-phase AC primary network via chokes 26 and static switches 28. A power source 40 is inserted in parallel with the chokes 26 and switches 28, corresponding essentially to the power source 40 as shown in FIG. 4. This power source 40 is connected to the primary network via an autotransformer 42. By said transformer 42 the operating voltage of the rectifier 36 is reduced to 80% of its supply voltage.

With higher pulse circuit arrangements, e.g. 12 pulses, of the rectifier 36, said transformer 42 can be a zig-zag transformer in order to reduce reactions of current harmonics in the primary network.

With the circuit according to FIG. 5 the inverter 30 is normally controlled in such a way that it covers only the idling losses of the converter machine 25. Since the rectifier 36 and the inverter 30 under normal conditions are only in a low-load operation, the losses of these components hardly enter into the balance of total losses, i.e. the converter system operates at the high efficiency which is the characteristic of the converter machine according to the invention.

When the frequency rises above or falls below the tolerated range, the static switches 28 are opened and the whole energy is supplied by the power source 40 including rectifiers 36 and inverter 30.

With a predetermined drop of the voltage of the primary network or during primary network breakdown, the energy is supplied from the battery 34 via the inverter 30.

The redundancy of this two-channel construction ensures that, even when there is a breakdown of individual components in one of the two power-supply sources, the power supply to the converter machine 25 is guaranteed.

Figure 6:
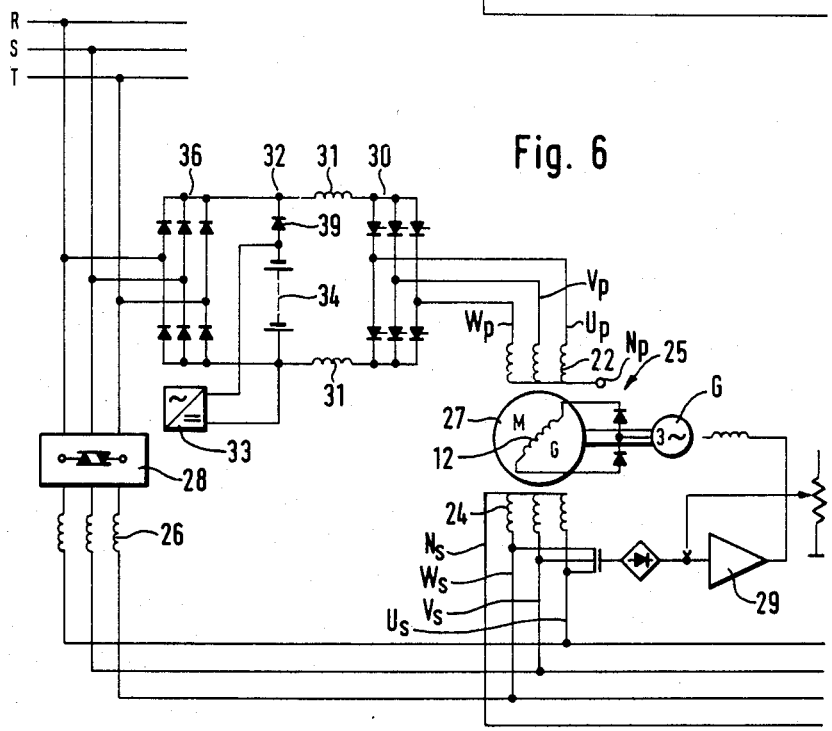

The circuit shown in FIG. 6 is fundamentally the same as that shown in FIG. 5. It differs in that here the power supply from the primary network via the static switches 28 and the chokes 26 is connected to the secondary winding 24 of the converter machine 25. With this mode of operation, the second winding has only to cover the wattless power of the load, while the real power is taken from the primary network.

Due to the damping cage, the secondary winding has only a very low impedance for all frequencies except for the fundamental frequency. Therefore the converter machine together with the chokes 26 installed on the supply network side acts as a band-pass filter tuned to the basic frequency of the primary network, i.e. is largely kept free from the critical load disturbing phenomena in the primary network.

Since the primary winding 22 and the secondary winding 24 are largely relieved of the load current, a further considerable increase of the overall efficiency results from the circuit shown in FIG. 6. If the voltage or the frequency in the primary network is out of its tolerance limits the static switch 28 opens and the power supply is effected by the power source 40 as described above under reference to FIG. 5.

With the circuits shown in FIGS. 4 to 6, the bridgeable duration of a power breakdown is limited by the capacity of the battery provided. Usually this suffices for a period of minutes only. In such systems, therefore, an additional emergency power unit including a prime mover is usually installed. In particular this prime mover may be an internal-combustion engine or a gas turbine engine. The battery then serves to bridge the time interval which the emergency power unit requires in order to generate the voltage required. Such emergency power units are generally so dimensioned that along with supplying especially critical load they also supply less critical loads through an emergency-power bus bar. In known systems it is necessary to provide, besides a converter machine for the uninterrupted power supply, an additional generator driven by the prime mover, powering the converter machine and feeding the emergency-power bus bar.

Figure 7:
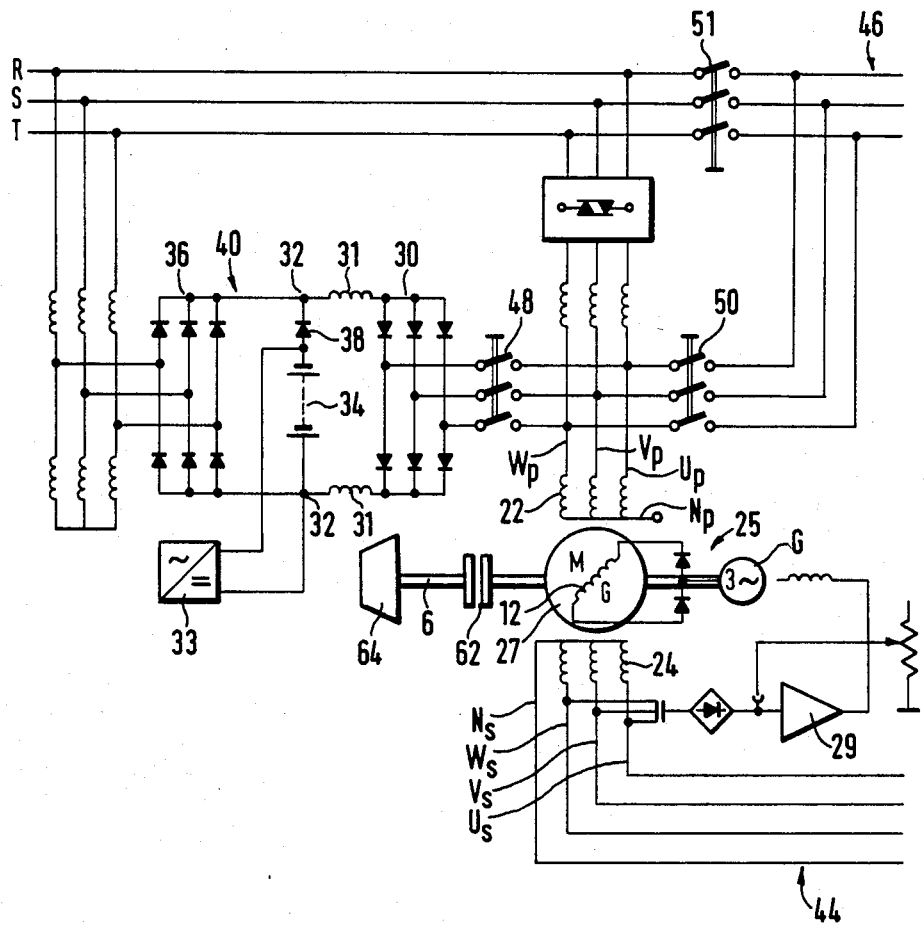
FIG. 7 shows an emergency power system including a converter machine in accordance with the invention.

A system by which the requirements of this kind of emergency-power supply are met, with considerably less expenditure on equipment, is represented in FIG. 7.

The converter machine 25 according to FIGS. 1 and 2 is connected to the three-phase AC primary network by a circuit as shown in FIG. 5. A circuit as shown in FIG. 6 is also applicable. Besides the secondary network 44 which is supplied by the secondary winding 24 and to which the critical loads to be supplied without interruption are connected, at least one emergency bus bar 46 is provided. This bus bar is normally fed directly from the primary network via the switch 51. The primary winding 22 of the converter machine 25 can be cut off from the power source 40 by a switch 48. The primary winding 22 of the converter 25 is connectable via a switch 50 to the bus bar 46. The two switches 48 and 50 are used alternatively, i.e., the switch 50 can be closed only when the switch 48 is open and vice versa.

The shaft 6 of the rotor 27 of the converter machine 25 can be coupled via a coupling 62 to a prime mover 64 which is preferably mounted, together with the converter machine 25, on a common framework. In normal operation the switches 48 and 51 are closed and the switch 50 is open, thus the converter machine 25 is fed either by the primary network or the power source 40 as described above under reference to FIGS. 3 to 6. The emergency bus bar 46 is connected to the primary network RST via switch 51.

If a breakdown of the primary network occurs, a power supply to the primary winding 22 is effected by the power source 40. The prime mover 64 is started up and on reaching its rated speed it is automatically coupled to the shaft 6 of the rotor 28 of the converter machine 25 via the coupling 62. After being coupled to the prime mover the converter machine works with its secondary winding 24 like a normal generator supplying power to the secondary network 44. Thus the switch 48 can be opened. The primary winding, which until the coupling of the rotor with the prime mover has supplied power to the secondary winding, can after opening of switches 48 and 51 be connected to the bus bar 46 by closing switch 50. The primary winding operates then as another generator winding supplying power to the bus bar 46. Thereby the full rated output of the converter machine i.e. the double of the power supplied by the secondary winding to the critical load can be provided during emergency operation. Thus an additional generator, driven by a prime mover and providing power for said emergency bus bar as required in known emergency power supply units can be avoided.

If the converter machine is utilized in an emergency power system in the manner described, the shaft 6 must be so dimensioned that the combined power to be supplied by the primary and secondary windings of the converter machine can be derived mechanically from the prime mover.

Figure 8:
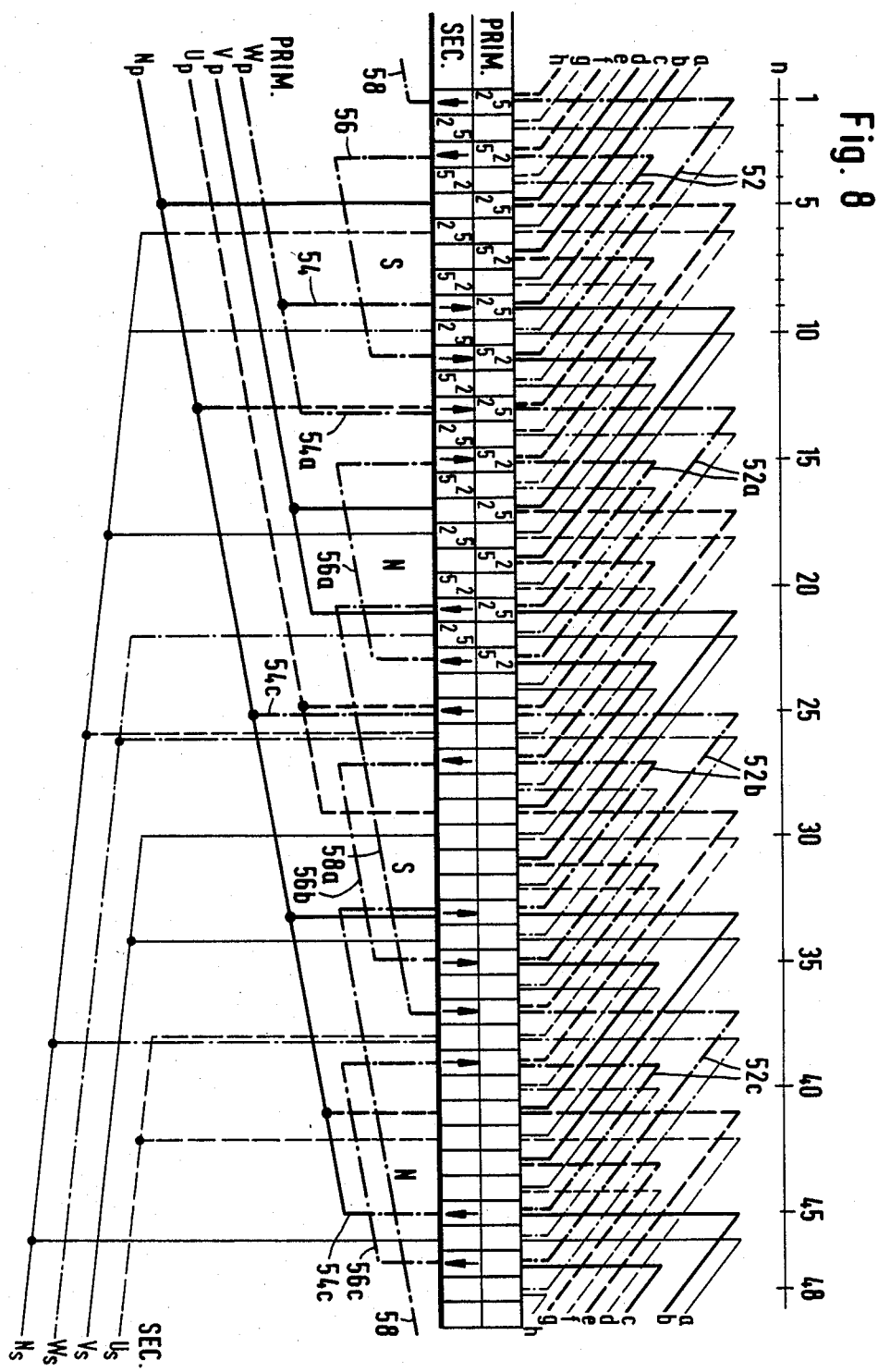
FIG. 8 shows a winding diagram of a converter machine according to the invention.

In FIG. 8 is shown the winding diagram of an embodiment of a synchronous salient-pole converter machine designed as a three-phase AC machine. The data of said machine are:

|  | Europe | USA |
| --- | --- | --- |
| capacity | 300 kVA | 360 kVA |
| voltage | 400 V | 480 V |
| frequency | 50 Hz | 60 Hz |
| number of poles | 4 | 4 |
| number of slots | 48 | 48 |

As usually done in winding diagrams the development of the stator of the converting machine is shown. Above said stator development is shown a linear scale with the ordinal numbers n1 to n48 assigned to the individual slots in the stator. Above the stator all primary and secondary windings are illustrated. Below the stator are shown only the connections of the individual pole windings for one of the three phases of the primary winding, which phase is to be described in detail in the following.

The primary winding to be connected to the power supply of the machine is illustrated by fully drawn lines, while the secondary winding is shown by fade lines. The individual pole windings of the primary winding are with one end each connected to connector blocks for the three AC phases $U_p$, $V_p$ and $W_p$ of the power supply. The other ends of the windings are each connected to a common connector block for the neutral phase $N_p$ of said power supply.

Accordingly for the secondary winding are provided connector blocks for the three phases $U_s$, $V_s$ and $W_s$ of the secondary winding, to which connector blocks are each connected one end of the pole windings of the secondary winding, while the other ends each of said pole windings are connected to a common connector block for the neutral phase $N_s$ of the secondary winding. The connector blocks of said secondary winding are to be connected to the phases of a secondary network.

The phase U for the primary winding and the secondary winding is shown by a dashed line, the phase V fully drawn and the phase W by a dash-dot-line. The neutral wire is illustrated by a dash-dot-line with double dots.

The connections cutted in the diagram are marked with the letters a to i at the left end at the right on the winding diagram.

For the four pole windings of the phase $W_p$ of the primary winding the drawing shows the connections as example for the windings of all phases of the primary and secondary winding.

The individual windings of the poles 52 to 52c each consist of two coils. The windings 52 and 52b or 52a and 52c respectively of the four pole windings are each connected in series and cover the south poles and north poles respectively. The groups of windings formed in this way are connected in parallel.

The coil pitch for the pole coils is 1:7:11. The external coil extends over 11 slots, while the internal coil extends over 7 slots. In case of the executed machine are provided two windings for the internal coil and five windings for the external coil.

Thus the pole windings are wound as follows. The conductor wire for the pole winding 52 and 52b is connected to the connector block of the power supply phase $W_p$ with its end 54. First of all the wire is wound anticlockwise with the two windings through the slots n9 and n3 forming the external coil of the pole windings. Via 56 it is transferred to slot n11 and is then wound through slots n11 and n1 with five windings forming the internal coil of the pole winding 52. It is then transferred via 58 to slot n33 and again wound with two windings through slots n33 and n27 and then via 56b with five windings through slots n35 and n25 thus forming the external and the internal coil of pole winding 52b. The end 54b of the conductor wire is then connected to the connector block of the neutral phase $N_p$.

The pole windings 52a, 52c of the second pair of poles are wound in contrary direction, i.e. clockwise. Proceeding from the connector block $W_p$ via 54a the wire is first of all wound with five windings through the slots n13 and n23. Via 56a the wire is then wound with two windings through the slots n15 and n21—pole winding 52a. Via 58a the wire is then transferred to the pole winding 52c, which is wound with five windings through the slots n37 and n47 and via 56c with two windings through the slots n39 and n45. The wire is then via 54c connected to the connector block for the neutral phase $N_p$.

The pole windings coordinated with the phases $U_p$ and $V_p$ and of the secondary winding are wound accordingly.

The pole windings of the secondary winding being each time displaced by one coil pitch in respect to the pole windings of the primary winding. In the drawing the primary winding is allocated to slots marked by an odd ordinal number, i.e. the slots n1, n3, n5 and following, while the secondary winding is allocated to slots marked by an even ordinal number, i.e. n2, n4, n6 and following.

In a converter machine having 48 slots as described in the foregoing each slot is provided with the same number of wires. In the embodiment in each slot seven wires are embedded. Although this is an optimum design, it is not compulsory. Depending on the possibly predetermined number of slots, the windings are always to be optimized in accordance with the design rules of electrical engineering.

I claim:

1. A rotary converter machine comprising a stator with a three-phase primary winding and a three-phase secondary winding as well as a rotor being provided with a damping winding and rotatably mounted in the stator, said rotor being provided with a d.c. exciting coil, said primary winding and said secondary winding being arranged on a common stator pack and located in continuous slots in the stator, each of the two windings extending over the whole axial length of said common stator pack.

2. A rotary converter machine as claimed in claim 1, in which said rotor is provided with salient-poles.

3. A rotary converter machine as claimed in claim 1, in which said exciting coil is provided with a brushless excitation.

4. A rotary converter machine comprising a stator with a three-phase primary winding and a three-phase secondary winding as well as a rotor being provided with a damping winding and rotatably mounted in the stator, said primary winding and said secondary winding being arranged on a common stator pack and located in continuous slots in the stator, each of the two windings extending over the whole axial length of said common stator pack, said damping windings having slot spacing such that the 5th, 7th, 11th, 13th, 17th and 19th harmonics which are generated either in the AC supply mains or in the load supplied by the converter machine are largely short-circuited.

5. A rotary converter machine as claimed in claim 4, in which said slot spacing of the damping winding equals ten electrical degrees.

6. A rotary converter machine comprising a stator with a three-phase primary winding and a three-phase secondary winding as well as a rotor being provided with a damping winding and rotatably mounted in the stator, said rotor being provided with a d.c. exciting coil, said primary winding and said secondary winding being arranged on a common stator pack and disposed in continuous and substantially separate slots in the stator, each of the two windings extending over the whole axial length of said common stator pack.

7. A converter system including a rotary converter machine as claimed in any one of the preceding claims, in which there are chokes between the primary winding and the mains supply.

8. A converter system as claimed in claim 7, in which there is a static switch between the primary winding and the mains supply.

9. A converter system including a rotary converter machine as claimed in any of claims 1 or 2-6 inclusive, in which the primary winding is supplied by a three-phase inverter which is supplied from the mains supply via a three-phase rectifier.

10. A converter system as claimed in claim 9, in which said inverter is arranged to be alternatively supplied by a battery.

11. A converter system as claimed in claim 9, in which the power-supply circuit comprising the rectifier and the inverter is connected in parallel to a mains supply connected to the primary winding of the rotary converter machine via chokes in series with static switches and in which the inverter during operation on the mains supply is controlled as to provide substantially only the idling losses of said converter machine.

12. A converter system as claimed in claim 11, in which a prime mover is provided to drive the rotor of the converter machine through engageable coupling means, and in which control means are provided by which after interruption of the mains supply said prime mover is started and after having reached its predetermined speed is coupled to drive said converter machine and by which after said coupling the motor winding of said converter machine, now acting as a second generator winding, is connected to an emergency bus bar.

13. A converter system as claimed in claim 9, in which the power supply circuit comprising the rectifier and the inverter is connected to the primary winding of the rotary converter machine and a power supply circuit comprising chokes in series with static switches is connected to a mains supply in parallel with the power supply circuit comprising the rectifier and the inverter and to the secondary winding of the rotary converter machine and in which the inverter during operation on the mains supply is controlled as to provide substantially only the idling losses of said converter machine.

14. A converter system as claimed in claim 13, in which a prime mover is provided to drive the rotor of the converter machine through engageable coupling means, and in which control means are provided by which after interruption of the mains supply said prime mover is started and after having reached its predetermined speed is coupled to drive said converter machine and by which after said coupling the motor winding of said converter machine, now acting as a second generator winding, is connected to an emergency bus bar.

15. A converter system including a rotary converter machine as claimed in any of claims 1 or 2-6 inclusive, in which the primary winding is supplied by a three-phase inverter which is supplied by a battery.

16. A rotary converter machine comprising a stator having a three-phase primary winding and a three-phase secondary winding, and a rotor mounted in said stator, said rotor including a damping winding, salient poles, and a d.c. exciting coil, said primary winding and said secondary winding being arranged on a common stator pack and disposed in continuous and substantially separate slots in the stator, each of the two windings extending over the whole axial length of said common stator pack.

17. A rotary converter machine comprising a stator having a three-phase primary winding and a three-phase secondary winding, and a rotor mounted in said stator, said rotor including a damping winding, salient poles, and a d.c. exciting coil having a brushless excitation, said damping winding being provided in the salient poles, said primary winding and said secondary winding being arranged on a common stator pack and disposed in continuous and substantially separate slots in the stator, each of the two windings extending over the whole axial length of said common stator pack.

* * * * *